United States Patent [19]
Rogalski et al.

[11] Patent Number: 5,964,687
[45] Date of Patent: Oct. 12, 1999

[54] CONTAINER FITMENT APPLICATOR

[75] Inventors: Edward M. Rogalski, Pinckney; Barry C. Owen, Southfield; Mark R. Kucera, Walled Lake, all of Mich.

[73] Assignee: Elopak Systems AG, Glattbrugg, Switzerland

[21] Appl. No.: 08/680,901

[22] Filed: Jul. 16, 1996

[51] Int. Cl.⁶ ...................................................... B31B 1/90
[52] U.S. Cl. ................................ 493/102; 493/14; 493/87
[58] Field of Search ................................... 493/8, 13, 12, 493/14, 102, 87, 114, 214, 901, 104, 184, 152; 189/425, 462, 480, 726

[56] References Cited

U.S. PATENT DOCUMENTS

| | | |
|---|---|---|
| 3,812,572 | 5/1974 | Weikert . |
| 4,386,923 | 6/1983 | Okushita ................................... 493/87 |
| 4,456,118 | 6/1984 | Kauffmann et al. ..................... 198/480 |
| 4,788,811 | 12/1988 | Kawajiri et al. ........................... 53/426 |
| 5,267,934 | 12/1993 | Pape et al. ................................. 493/87 |
| 5,366,433 | 11/1994 | McCormick ........................... 493/87 X |
| 5,435,803 | 7/1995 | Owen et al. .............................. 493/87 |
| 5,484,374 | 1/1996 | Bachner et al. ........................... 493/87 |

FOREIGN PATENT DOCUMENTS

| | | |
|---|---|---|
| 2238287 | 5/1991 | United Kingdom . |
| WO 95/10408 | 4/1995 | WIPO . |

*Primary Examiner*—David A. Scherbel
*Assistant Examiner*—Anthony Ojini
*Attorney, Agent, or Firm*—Reising, Ethington, Barnes, Kisselle, Learman & McCulloch, P.C.

[57] ABSTRACT

A four-armed pour spout fitment applicator adaptable to rotating two of the arms into open-topped cartons and applying flanged pour spout fitments outwardly through openings in a pair of adjacent carton top panels, while the other two arms are adapted to substantially receive two additional fitments transferred thereto by two air cylinders. External ultrasonic sealers have horns serving to engage the outer panel surfaces to seal the flanges of the fitments to the inner surfaces of the top panels around the openings.

20 Claims, 4 Drawing Sheets

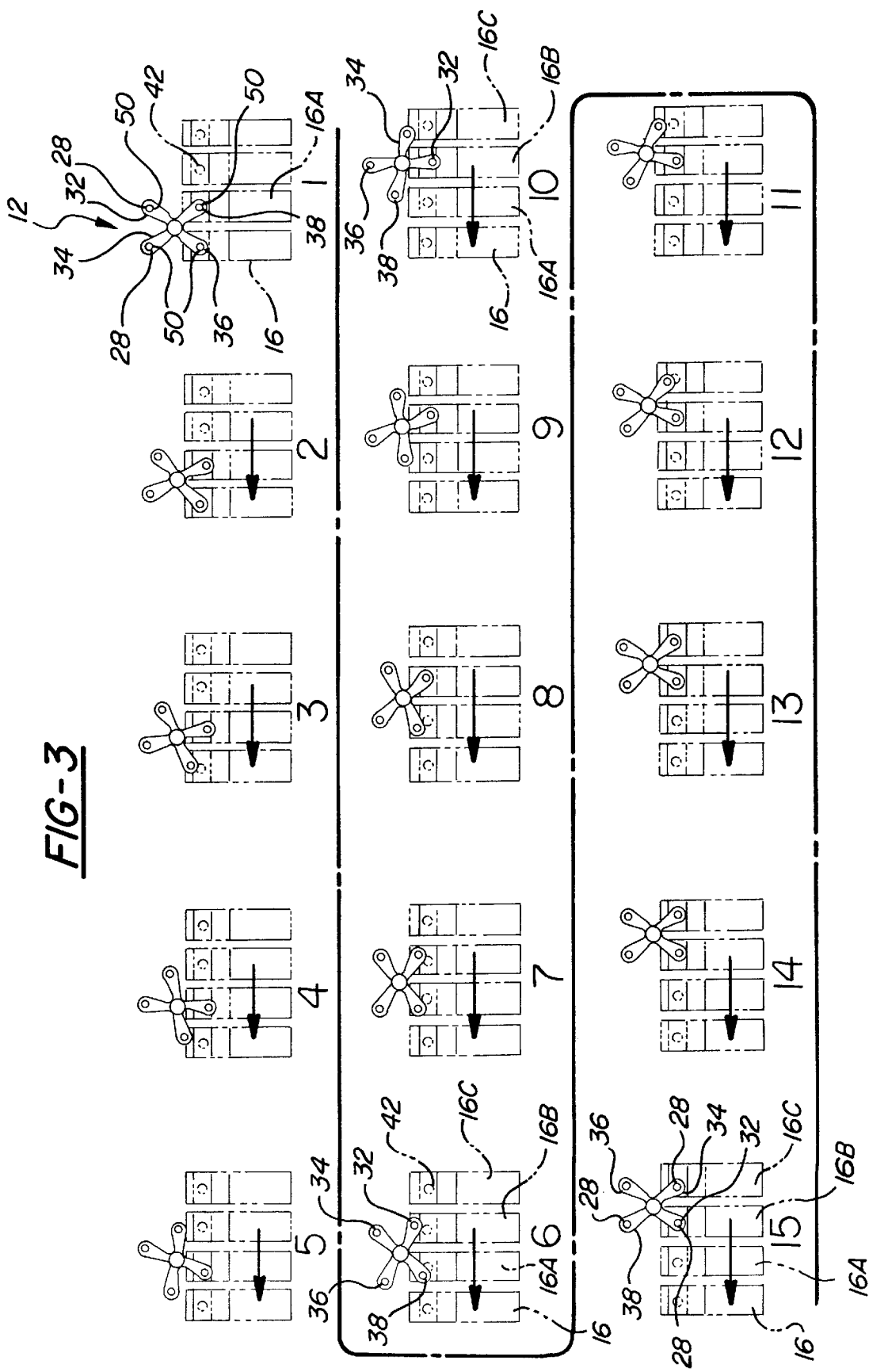

CONTAINER FITMENT APPLICATOR

FIELD OF THE INVENTION

This invention relates generally to container fitment applicators, especially to such applicators for use on carton forming, filling and sealing machines and, more particularly, to such machines in which pour spout fitments are applied while the cartons are being processed thereon.

BACKGROUND ART

Forming, filling and sealing machines having pour spout applicators at one of the stations therealong are known. For example, British Pape Patent Application Publication No. GB2,238,287 discloses an application station at which a rotatable mandrel or bar is provided, with the mandrel having two bosses projecting therefrom. While one of the bosses takes a pouring spout from a spout-conveying arrangement, the other of the bosses delivers a pouring spout to an opening through a panel of an open top of a carton, and vice-versa. In more detail, as a carton is indexed into the application station, the mandrel is rotated in the direction of the carton travel into the open top of the carton, aligning the spout-carrying boss with the opening formed in the selected panel of the top closure of the carton; the boss and pouring spout are moved laterally into the opening; the inner flanged end of the pouring spout is secured, such as by ultrasonic welding, to the inner wall around the opening; and the boss is withdrawn from the opening and then rotated out of the open top. An outer cap is attached to the pouring spout before assembly.

Bachner et al. U.S. Pat. No. 5,484,374 discloses an applicator including a rotatable and translatable anvil having three (or more or fewer) radially extending arms. A mandrel on one arm frictionally engages a pour spout fitment simultaneously with a second mandrel inserting a fitment into a container hole. An ultrasonic sealer vibrates the container wall against the anvil to weld the fitment to the container. The applicator applies one fitment to one container at a time.

Other pouring spout applicators are disclosed in Kawajiri U.S. Pat. No. 4,788,811 and Okushita U.S. Pat. No. 4,386,923. Kawajiri discloses a horizontally elongated pour spout fitment attaching turret at a location upstream of the usual turret and radial mandrels on which the bottom end closure is folded and sealed. The fitment attaching turret includes a pusher at one station for pushing an open-ended package onto a sucker device holding and inserting a pour spout fitment into an opening in a package top panel. The fitment attaching turret is then rotated to a second station where an anvil is axially inserted into the package, cooperable with an ultrasonic horn for sealing a flange of the fitment to the inner surface of the top panel.

Okushita U.S. Pat. No. 4,386,923 discloses a bag-in-box arrangement wherein a fitment is attached to the bag which is then inserted through a hole in a flap of the box, while both are in the collapsed or blank state.

Each of U.S. Pat. Nos. 5,267,934 and 5,435,803 disclose pour spout fitment applicators wherein the fitment is applied from within the carton, outwardly through an opening therein.

DISCLOSURE OF THE INVENTION

A general object of this invention is to provide an improved container fitment applicator, more particularly, an improved carton pour spout fitment applicator for use on a carton forming, filling and sealing machine on which cartons are indexed in groups.

Another object of the invention is to provide an improved carton pour spout fitment applicator adaptable to applying the pour spout fitments to cartons while the cartons are being conveyed by a conveyor, or similar transporting means, wherein cartons aligned with the applicator are closely arrayed.

A further object of the invention is to provide an improved pour spout fitment applicator adaptable to applying two flanged pour spout fitments at the same time into existing openings in upper closure panels of a pair of adjacent cartons from the insides thereof, and having the flanges sealed to the inside surfaces.

Still another object of the invention is to provide a four-armed pour spout fitment applicator adaptable to rotating two of the arms into open-topped cartons and applying flanged pour spout fitments outwardly through openings in a pair of adjacent carton top panels, while the other two arms are adapted to substantially receive two additional fitments. A pair of air cylinders serve to transport the two additional fitments to the other two arms and positively place the same thereon. An external ultrasonic sealer and horn arrangement serves to engage the outer panel surfaces to seal the flanges of the fitments to the inner surfaces of the top panels around the openings while the pair of cylinders are being actuated.

These and other object and advantages of the invention will become more apparent when reference is made to the following drawings and the accompanying description.

BRIEF DESCRIPTION OF THE DRAWINGS

FIG. 3 is a schematic representation of fifteen operational steps;

BEST MODE OF CARRYING OUT THE INVENTION

Figure 1:
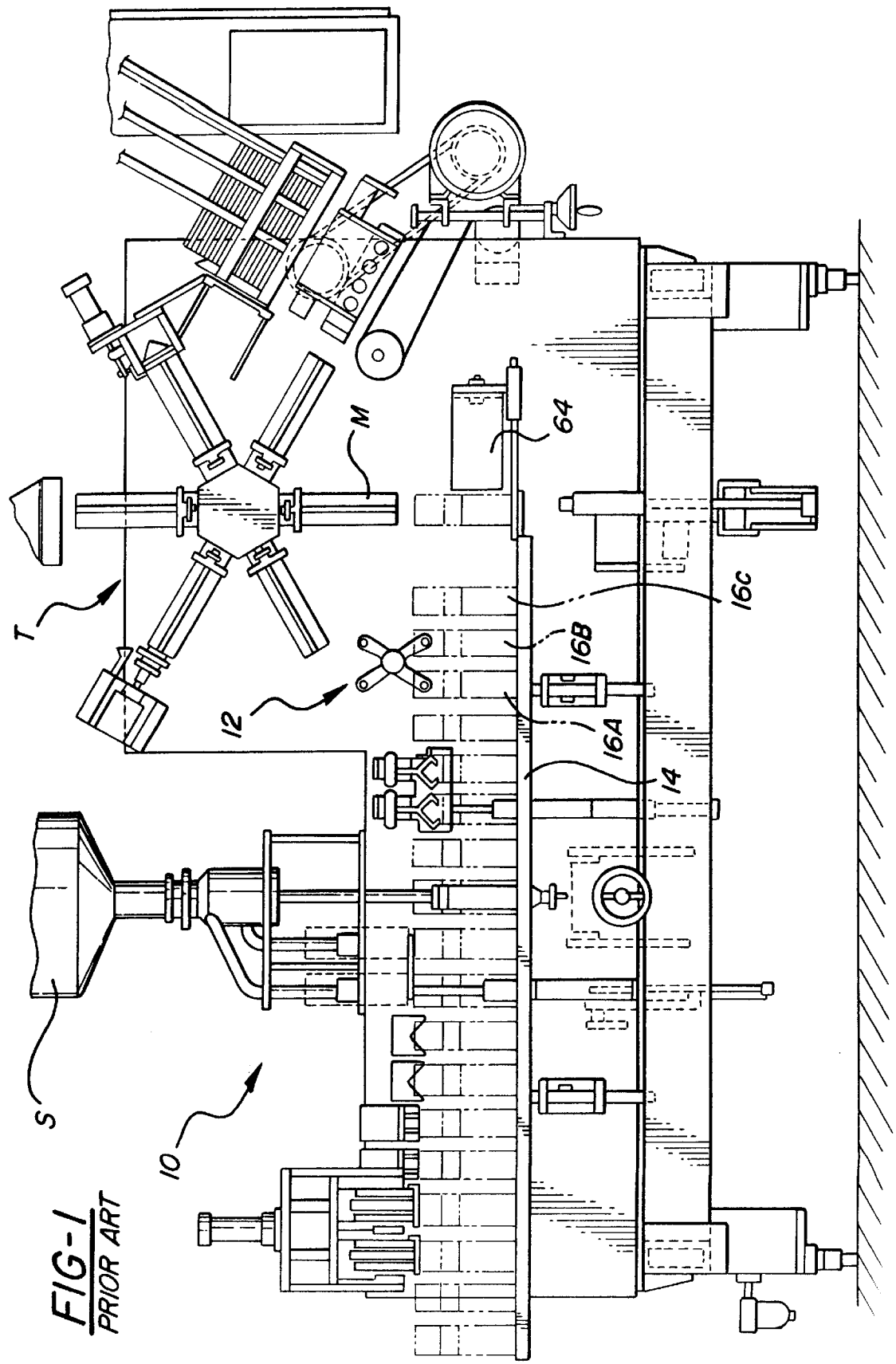
FIG. 1 is a side elevational view of a double indexing forming, filling and sealing machine embodying the invention.
Figure 2:
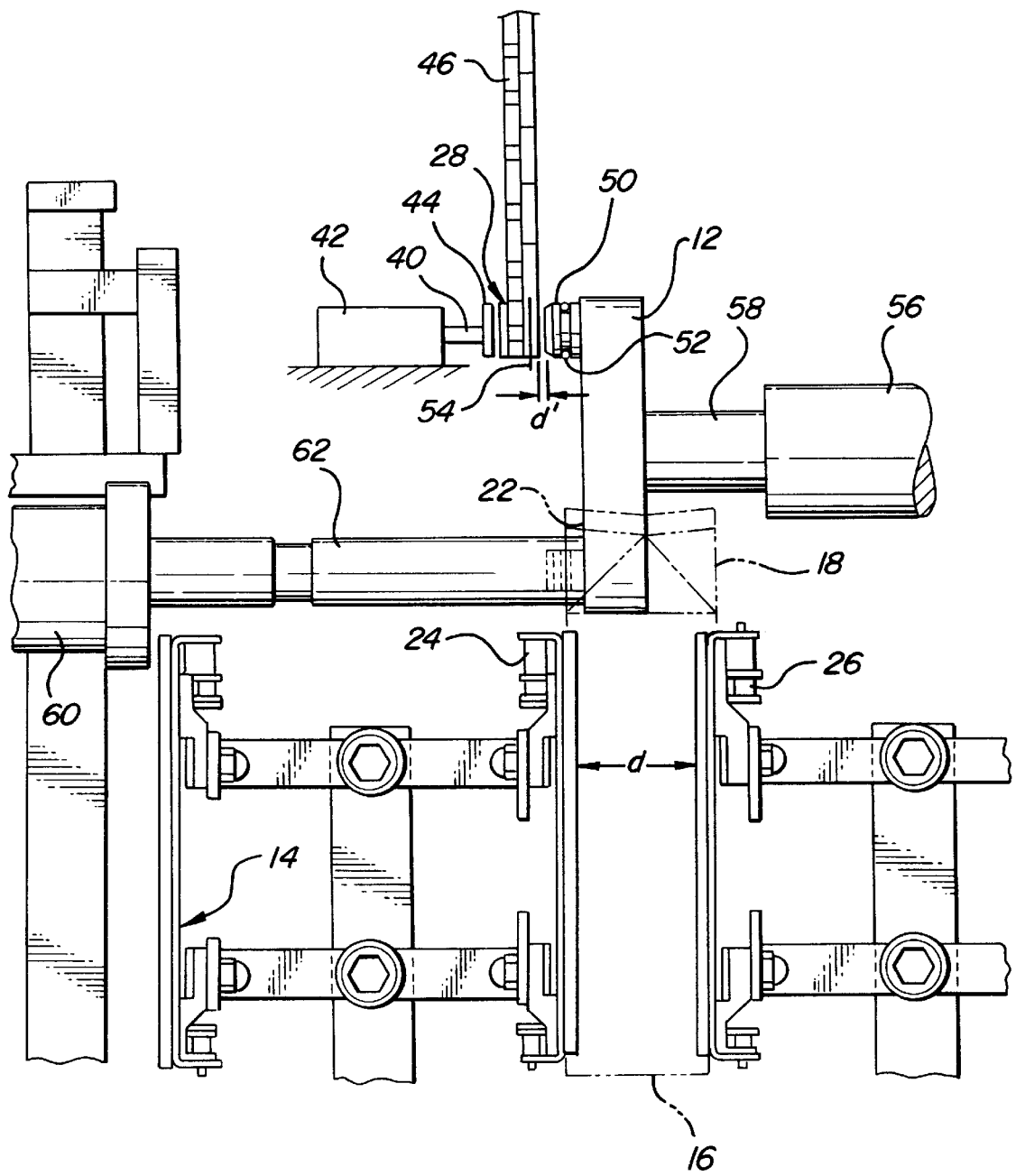
FIG. 2 is an enlarged side elevational view of the inventive pour spout fitment application station of FIG. 1.
Figure 5:
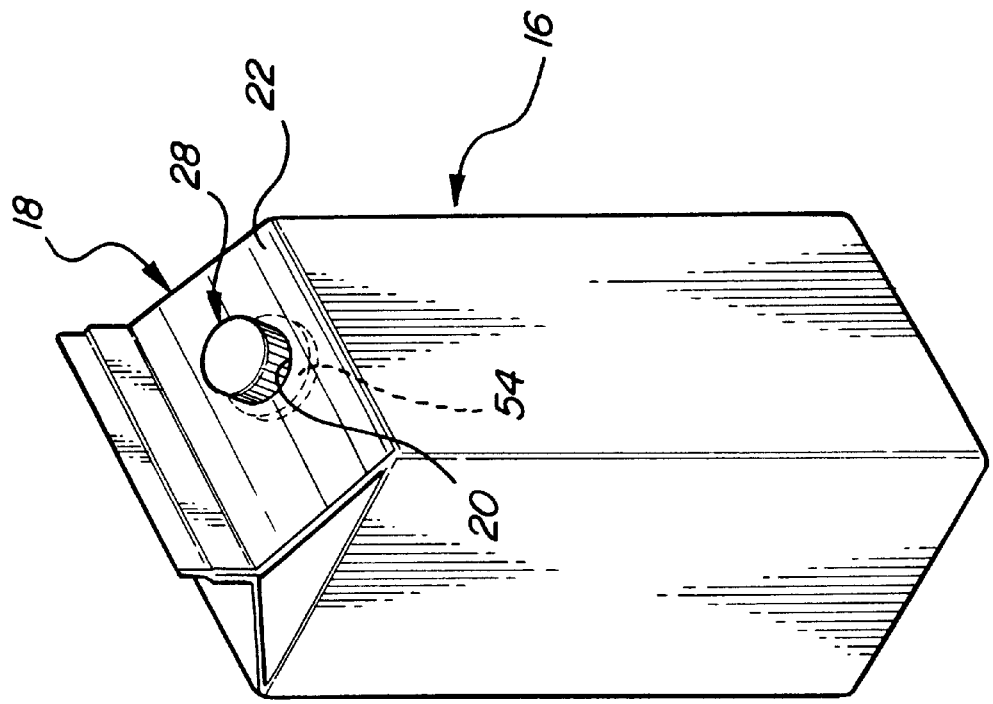
FIG. 5 is a perspective view of the finished carton product.
Figure 4:
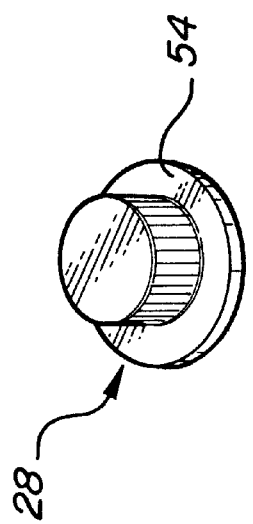
FIG. 4 is a perspective view of a pour spout fitment embodied in the invention.

Referring now to the drawings in greater detail, FIGS. 1 and 2 illustrate a forming, filling and sealing machine 10 embodying a pour spout fitment applicator 12, and including a conveyor 14 carrying thermoplastic coated cartons 16 having open-topped upper end closures 18. A hole 20 is formed in a selected panel 22 of each end closure 18. The applicator 12 is mounted on the machine 10 intermediate the usual indexable turret mechanism T including a plurality of mandrels M and the source S of a selected liquid.

As shown in FIG. 2, the conveyor 14 comprises two endless chains 24 and 26 spaced a predetermined distance d apart, within which a series of closely spaced apart cartons 16 are carried, with the panel 22 bearing the opening 20 facing toward one of the chains 24.

As noted in FIG. 3, the pour spout fitment applicator 12 is positioned to receive two pour spout caps or fitments 28 at a time on its two exposed arms 32 and 34 at position 1, while two fitments on two inner arms 36 and 38 are positioned for placement, as will be explained, into two top panels 22 of adjacent cartons 16 and 16A during a dwell while being conveyed by the double indexing conveyor 14 (FIG. 2). As the conveyor 14 indexes through positions 2–6, the arm 32 will rotate toward and into carton 16B. During further indexing of the conveyor 14 through positions 7–10, the arm 34 rotates into carton 16C. During further indexing through positions 11–15, the arms 32 and 34 will become aligned with the receiving holes 20 in the top panels 22 of cartons 16B and 16C for placement of two fitments 28 therein, with the arms 36 and 38 now being in the location for receiving two more fitments 28 for the next cycle.

As shown in FIG. 3, the arm 32 has rotated through 180° for the cycle from position 1 to position 15. Its next 180° rotation will bring the arm 32 back to the position 1, to receive its next pour spout fitment 28. It has been determined, in the example shown, that each carton 16 has indexed through a distance of 7.0 inches for a quart processing machine, or 9.0 inches for a half gallon processing machine, in moving from position 1 to position 15, along the conveyor 14.

Referring once again to FIG. 2, a piston 40 of a suitable cylinder 42, having a flanged end 44, which, for some fitment sizes, may include a cylindrical shape for surrounding the fitment 28, serves to push each end fitment from a track or chute 46 through a distance d' onto an aligned extension type receiver or spigot 50 of an applicator arm. Each spigot 50 has an elastomeric ring 52 therearound which will assume an interference fit in the inner periphery of the flanged end of the fitment 28.

Each track 46 extends vertically downwardly at the end thereof to terminate adjacent the applicator 12. The track 46 is adapted to hold a row of pour spout fitments 28, each having a flange 54 thereon slidably aligned end-to-end therein, as received from suitable external loading means. Such loading means may include a vibratory parts feeder (not shown), known to have been available from Syntron Co., Homer City, Pa. Such a parts feeder automatically orients a load of flanged fitments 28 and feeds them in their oriented attitude to each track 46. A pair of tracks may extend from one parts feeder bowl, or from a pair of feeder bowls.

The flange 54 of the fitment 28 is confined within the edges of the track 46, as shown in FIG. 2, and is snapped outwardly therefrom upon the fitment being pushed by the flanged end 44 of the piston 40.

A drive unit, represented as 56, is connected by a shaft 58 to the center of the applicator 12. The drive unit 56 is adapted to reciprocate the applicator 12 within the distance d, and to rotate the applicator through repeated 180° cycles shown in FIG. 3.

While moving laterally to place two fitments 28 into two holes 20 in two adjacent panels 22 from the arms 36 and 38, the two arms 32 and 34 extend toward two additional fitments 28 from two adjacent tracks or chutes 46, stopping the distance d' away therefrom to await the conveyance of the fitments by the pistons 40 and ends 44.

The application station includes two ultrasonic sealers 60 (FIG. 2), each including a retractable horn 62 having an axis aligned with the hole 20 in the panel 22. As the applicator 12 places the two fitments 28 into two holes 20, the two vibrating horns 62 engage the outer surfaces of two panels 22, opposite the flanges 54, to thereby bond the flanges to the inner surfaces of the two panels. While the bonding process is being accomplished, the pistons 40 and their encompassing ends 44 engage the two adjacent fitments 28 and convey same through the distance d' to slide same onto the two spigots 50.

The horns 62 and the applicator 12 then retract to begin the next cycle.

INDUSTRIAL APPLICABILITY

It should be apparent that the invention provides an improved carton pour spout fitment applicator that is cooperable with a double indexing conveyor of a high production forming, filling and sealing machine.

It should be further apparent that the invention is such that, for a machine which indexes closely arrayed cartons two at a time along one path, only one applicator is employed to accommodate two adjacent cartons. For such a machine, there would be a dual-mandrel turret, or a single-mandrel turret and a single to dual indexing carton transfer mechanism 64, as shown in FIG. 1, and as disclosed in U.S. Pat. No. 4,456,118, with, of course, downstream multiple breakers, fillers, folders and sealers.

It should also be apparent that the invention is adaptable to either two or three arms as well as to the four arms described above.

It should be still further apparent that the invention provides an applicator arrangement having air cylinders which positively apply pour spout fitments to spigots, in contrast to an applicator which depends upon only a friction fit of a receiver adapted to first insert into and then to pull a fitment from a stationary escapement.

While but one embodiment of the invention has been shown and described, other modifications thereof are possible within the scope of the following claims.

What is claimed is:

1. An applicator for concurrently placing first and second fitments onto first and second adjacent containers, the applicator comprising first, second, third and fourth arms extending away from an axis, each arm having a receiver means formed adjacent the distal end thereof adapted to receive a fitment, and driving means for rotating said applicator so as to cause the first and second arms carrying said first and second fitments to become concurrently aligned with the first and second containers for applying the respective first and second fitments thereto, and to cause the third and fourth arms to be in angular positions to concurrently receive third and fourth fitments, respectively.

2. An applicator according to claim 1, wherein said driving means serves also to reciprocate said applicator to place said first and second fitments in respective holes in said first and second containers.

3. An applicator according to claim 2, and further comprising external ultrasonic means for bearing on an outer surface around each of said first and second fitments to bond respective flanges of said first and second fitments to respective inner surfaces around the holes in the first and second containers.

4. An applicator according to claim 1, and further comprising placing means for placing said third and fourth fitments onto the receiver means of said third and fourth arms.

5. An applicator according to claim 4, wherein said placing means includes fixed cylinders each having a reciprocal piston for alignment with a corresponding receiver means.

6. An applicator according to claim 1, wherein said first and second arms are arranged to rotate into open tops of the first and second containers, respectively, and said third and fourth arms are arranged to rotate into open tops of third and fourth containers, respectively.

7. For use with indexing containers having open tops and holes formed in selected panels thereon, the improvement comprising an applicator having four spaced apart, radially extending arms each adapted to receive and carry a pour spout fitment, and drive means (1) for rotating said applicator to enter said open tops and simultaneously align two arms carrying a first pair of fitments with two holes while placing the other two arms in position to receive a second pair of fitments and (2) for extending said applicator laterally through a predetermined distance to place said first pair of fitments in said two holes, and retracting prior to continued rotation.

8. For use with indexing containers having open tops and holes formed in selected panels thereon, and a track bearing aligned pour spout fitments, presenting a bottom fitment the improvement comprising an applicator having at least two generally oppositely disposed radially extending arms, each having receiver means formed adjacent the outer end thereof to receive and carry a pour spout fitment; drive means (1) for rotating said applicator to cause one of said arms to enter the open top of a first one of said containers and align said outer end carrying a first fitment with the hole therein while moving the receiver means of one of said arms to a position adjacent the bottom fitment in said track, and (2) for laterally moving the applicator to insert the first fitment into said hole and move one of said arms to a position a predetermined lateral distance from said bottom fitment in said track; ultrasonic means for sealing said first fitment to said selected panel; and air cylinder means for pushing the bottom fitment directly from said track through said predetermined distance to said receiver means of one of the said arms in a timed relationship with the sealing of said first fitment to said selected panel.

9. The improvement described in claim 8, wherein each said pour spout fitment includes a body having a flange for sliding through said track, and for abutting against and being sealed to the inside surface of said selected panel around said hole.

10. The improvement described in claim 9, wherein said receiver means includes a spigot formed on each arm for receiving a fitment.

11. The improvement described in claim 10, wherein said air cylinder means includes a piston having end means for abutting against said fitment body and causing said flange to snap out of said track and move through said predetermined distance to slidably mount the fitment onto said spigot.

12. For use with indexing two-at-a-time containers, each having open tops and holes formed in selected panels thereon, the improvement comprising an applicator having four substantially radially extending arms, each having receiver means formed adjacent the outer end thereof to receive and carry a pour spout fitment; drive means (1) for rotating said applicator to cause two arms to enter the open tops of a first and second container and align said outer ends carrying first and second fitments with the respective holes therein while concurrently placing the receiver means of the other two arms in positions to simultaneously receive third and fourth fitments from a pair of adjacent tracks, and (2) for laterally moving the applicator to insert the first and second fitments into said holes and move said other arm to a position a predetermined distance from said third and fourth fitments; ultrasonic means for sealing said first and second fitments to said selected panels; and dual air cylinder means for engaging and moving said third and fourth fitments from said tracks to said other two arms in a timed relationship with the sealing of the first and second fitments to said selected panels.

13. The method of applying two pour spout fitments from the bottom of two tracks to first and second arms of an applicator having at least four arms, and conveying such fitments from the third and fourth arms into holes formed in selected panels of open-topped containers being indexed into dwell positions adjacent to said third and fourth arms, said method comprising the steps of:

a. moving two pour spout fitments from the two tracks to the first and second arms of the applicator, b. rotating the first and second arms and the two fitments into two open-topped containers and the third and fourth arms into alignment with the bottom of the respective tracks, c. moving the two fitments laterally into the holes of the selected panels, and the third and fourth arms to a position adjacent the bottoms of the respective tracks, d. sealing the first and second fitments to the selected panels, e. moving third and fourth pour spout fitments from the bottoms of the tracks onto the third and fourth arms, and f. retracting the applicator to a position ready to repeat the steps b through f.

14. The method described in claim 13, wherein step e substantially coincides with step d.

15. The method described in claim 13, wherein steps a and e are accomplished with air cylinders.

16. The method described in claim 15, wherein each fitment includes a body having a flange on one end thereof for sliding cooperation with said track.

17. The method described in claim 16, wherein each said air cylinder includes a piston having a distal end formed to engage each said fitment body when said fitment assumes the bottommost position in said track.

18. The method described in claim 13, wherein step d is accomplished with ultrasonic sealing horns while the fitment flanges are backed up by the applicator arm.

19. The method described in claim 13, wherein said step b is accomplished by a drive unit rotatable about and translatable along an axis thereof.

20. The method described in claim 13, wherein said containers are double indexed.

* * * * *